(12) United States Patent
Gesmann

(10) Patent No.: US 9,542,291 B2
(45) Date of Patent: Jan. 10, 2017

(54) SELF-MONITORING EVENT-BASED SYSTEM AND METHOD

(71) Applicant: SOFTWARE AG, Darmstadt (DE)

(72) Inventor: Michael Gesmann, Darmstadt (DE)

(73) Assignee: SOFTWARE AG, Darmstadt (DE)

( * ) Notice: Subject to any disclaimer, the term of this patent is extended or adjusted under 35 U.S.C. 154(b) by 846 days.

(21) Appl. No.: 13/928,842

(22) Filed: Jun. 27, 2013

(65) Prior Publication Data
US 2014/0350888 A1    Nov. 27, 2014

(30) Foreign Application Priority Data

May 24, 2013    (EP) .................................... 13169119

(51) Int. Cl.
| | | |
|---|---|---|
| *G06F 11/30* | (2006.01) | |
| *G06F 17/30* | (2006.01) | |
| *G06F 11/07* | (2006.01) | |
| *G06Q 10/00* | (2012.01) | |

(52) U.S. Cl.
CPC .......... *G06F 11/30* (2013.01); *G06F 11/0709* (2013.01); *G06F 11/0757* (2013.01); *G06F 11/3006* (2013.01); *G06F 11/3072* (2013.01); *G06F 17/30389* (2013.01); *G06F 17/30451* (2013.01); *G06F 17/30516* (2013.01); *G06F 17/30864* (2013.01); *G06Q 10/00* (2013.01)

(58) Field of Classification Search
CPC   G06F 9/542; G06F 17/30516; G06F 11/0793; G06F 17/30477; G06F 17/30929; G06F 11/0757; G06F 11/3065; G06F 17/30389; G06F 17/30864; G06F 17/30451
USPC ................................ 702/127, 182–185, 189
See application file for complete search history.

(56) References Cited

U.S. PATENT DOCUMENTS

| | | | |
|---|---|---|---|
| 7,457,728 B2 | 11/2008 | Chen et al. | |
| 7,676,461 B2 | 3/2010 | Chkodrov et al. | |
| 8,463,487 B2 * | 6/2013 | Nielsen .............. | G06Q 10/0631 701/31.4 |
| 2013/0132560 A1 | 5/2013 | Hudzia et al. | |

FOREIGN PATENT DOCUMENTS

| | | |
|---|---|---|
| EP | 2 450 796 | 5/2012 |
| WO | WO 2013/016246 | 1/2013 |

OTHER PUBLICATIONS

Nn: "The HP Operations Agent Self-Monitoring Feature," XP055076652, Aug. 1, 2007, pp. 1-23 (24 pp.).
(Continued)

*Primary Examiner* — An Do
(74) *Attorney, Agent, or Firm* — Nixon & Vanderhye PC

(57) ABSTRACT

Certain example embodiments relate to an event-based system configured for self-monitoring. The event-based system includes a complex event processing (CEP) engine for consuming and producing events in accordance with at least one continuous query. The CEP engine in turn includes a first continuous query for producing events of a first event type and for consuming the events of the first event type. The CEP engine also is configured to detect performance issues based on the first continuous query.

21 Claims, 11 Drawing Sheets

(56) References Cited

OTHER PUBLICATIONS

Figure 1:
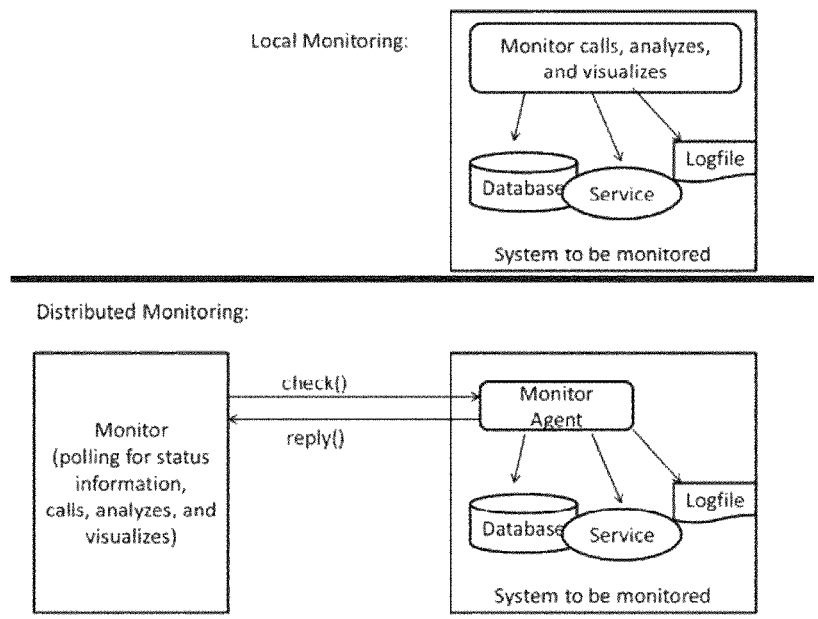

Werner, K., et al., "Automatic Monitoring of Logistics Processes Using Distributed RFID Based Event Data," Proceedings of the $3^{rd}$ International Workshop of RFID Technology—Concepts, Applications, Challenges—IWRT, XP055076653, Jan. 1, 2009, pp. 101-108 (8 pp.).
Appel et al., "Quality of Service in Event-based Systems", [Online] http://ceur-ws.org/Vol-581/gvd2010_4_3.pdf, printed Jun. 26, 2013, 5 pages.
DEBS 2010—The $4^{th}$ ACM International Conference on Distributed Event-Based Systems, Jul. 12-15, 2010, [Online] http://debs10.doc.ic.ac.uk/program.php, printed Jun. 26, 2013, 8 pages.

* cited by examiner

SELF-MONITORING EVENT-BASED SYSTEM AND METHOD

This application claims priority to EP Patent Application No. 13 169 119.8, filed May 24, 2013, the entire content of which is hereby incorporated by reference.

1. TECHNICAL FIELD

Certain example embodiments relate to an event-based system adapted for self-monitoring and to a corresponding method.

2. BACKGROUND AND SUMMARY

Complex computing systems are nowadays oftentimes implemented based on the so-called "event-driven architecture" (EDA), which is a software architecture pattern promoting the production, detection, consumption of and reaction to events. The EDA pattern may be applied in the implementation of applications and systems which transmit events among loosely coupled software components and/or services. The components of an event-driven system may act as event producers and/or event consumers. Consumers have the responsibility of applying a reaction after an event is presented. Building applications and systems around an EDA allows these applications and systems to be constructed in a manner that facilitates more responsiveness, because event-driven systems are, by design, more normalized to unpredictable and asynchronous environments.

Further, it is known to define quality standards to be met by computing systems and their components, respectively, in so-called service level agreements (SLAs). SLAs can be understood as negotiated agreements between two parties, namely the consumer and provider, and are typically enforced by measuring runtime values (so-called key performance indicators (KPIs)) and comparing the measured values with values specified in the SLAs. SLAs may thus be used to define technical performance requirements to be met by the distributed computing components, thereby defining operational requirements which have to be met to ensure a proper operation of the underlying computing system.

In this context, those skilled in the art will appreciate that such a monitoring of a computing system, e.g. by means of detecting the violation and/or fulfillment of SLAs is a difficult task given the vast amount of interacting computing components in real-life systems.

One technique for the monitoring and processing of events is commonly known under the term complex event processing (CEP). Generally, event processing is a method of tracking and analyzing (processing) streams of information (data) about things that happen and deriving a conclusion from them. Complex event processing (CEP) is event processing that combines data from multiple sources to infer events or patterns that suggest more complicated circumstances. The goal of CEP is to identify meaningful events (such as opportunities or threats) and respond to them as quickly as possible.

CEP introduces several important paradigm changes with respect to classical data processing technology, where the data is relatively static and various queries can be formulated in order to retrieve the desired data. In CEP, however, the queries are comparatively fixed and fed with continuously arriving streams of data (input events). CEP queries (also referred to as "continuous queries") typically correlate multiple input data items, look for patterns and produce output events in the form of alerts, error messages when a certain pattern is observed.

In summary, CEP applications have to deal with highly transient event data that arrives continuously at very high rates and have to produce the corresponding output events/alerts as soon as possible, ideally nearly in real-time. This includes push-based processing (also known as data driven processing) within main memory, which denotes a data flow approach where data to process is not requested (pulled) by the processing operator on demand or using certain scheduling techniques, but is directly provided (pushed) to the processing operator when it becomes available. The U.S. Pat. No. 7,676,461 B2 and U.S. Pat. No. 7,457,728 B2 provide further background information about complex event processing (CEP).

In the prior art, two traditional monitoring solutions have been proposed, namely local monitoring and distributed monitoring. In local monitoring the monitoring system runs on a local machine with the system to be monitored (cf. FIG. 1, upper half). Contrary, in distributed monitoring only local agents are integrated in the system to be monitored, but the monitoring system itself is separated from the system to be monitored (cf. FIG. 1, lower half). In this case, the monitoring system can take many distributed systems into account, wherein the agents typically do the local processing and the monitoring system polls for information from these agents (cf. the arrows "check( )" and "reply( )" in FIG. 1, lower half). Common providers of such traditional monitoring systems are for example CA Technologies, BMC, HP Software (Open View) and IBM Tivoli.

However, the two above summarized prior art solutions have several disadvantages. For example, it is required to install and run the monitoring system (which monitors the system to be monitored) as a separate component. In particular in the context of complex systems to be monitored with a huge amount of computing components, this creates a vast amount of additional workload, e.g. due to the need for constant polling for status information by the monitoring system, which could distort the behavior of the system to be monitored, thereby leading to false monitoring results. Furthermore, the monitoring system requires detailed knowledge about the system to be monitored, e.g. logic to check for the existence of processes, to properly call the component(s) to be monitored, to collect status information from reply messages, to properly analyze log files, and for the interpretation of information obtained from the system to be monitored.

Another disadvantage is that these monitoring solutions do not give any information about query responsiveness and cannot take event-specific semantics into account, except they implement their own event-based application and monitor the behavior. In this case, from the perspective of the event processing engine it is a normal client application. For example, for querying event streams where events and query processing support a clear semantics on time, it is important to have the events in a clearly defined order. That is, once an event e1 with timestamp t1 has been processed, an event e2 with timestamp t2<t1 cannot be processed anymore, since from the viewpoint of e2 the event e1 would have been already processed in the future and it can no longer be ensured that the processing of e2 solely uses events that did not occur after e2 has occurred. For solving such "out of sequence" scenarios, two approaches have been proposed in the prior art: Ignoring e2 and optionally writing an error message into a log file, or defining a delay time and buffering events until the delay time has elapsed, so that events arriving with a timestamp t2 after t1 can be processed if t1−t2 is smaller than the delay time. However, the key problems remain in these approaches: (a) The delay time only gives a buffer but still, with reduced probability, events can appear too late; and (b) The delay-time introduces latency for the query processing.

Figure 2:
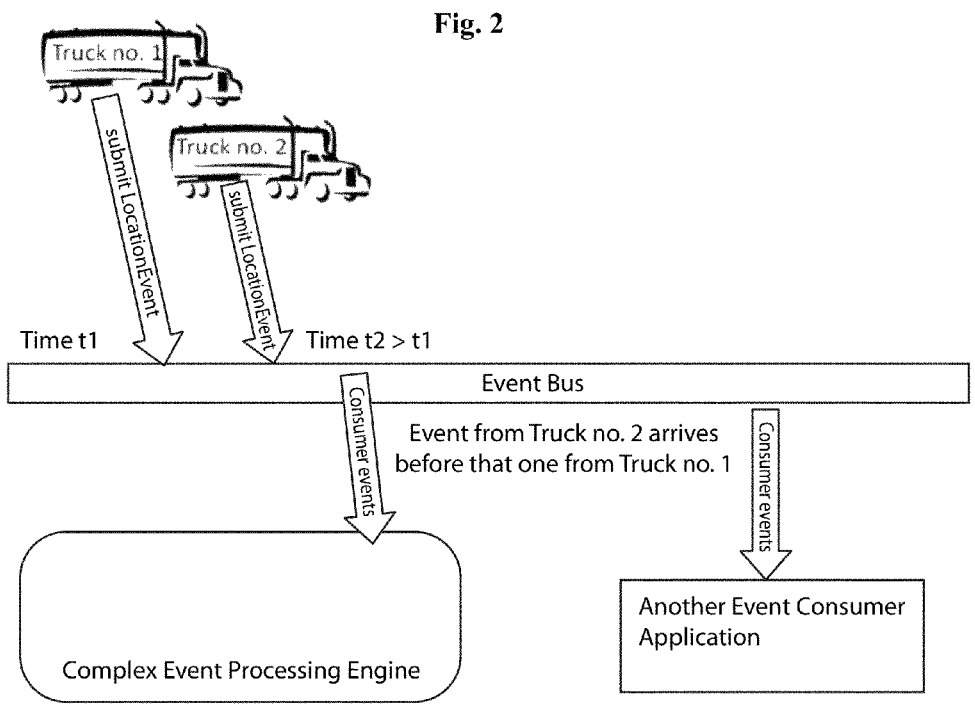
Figure 3:
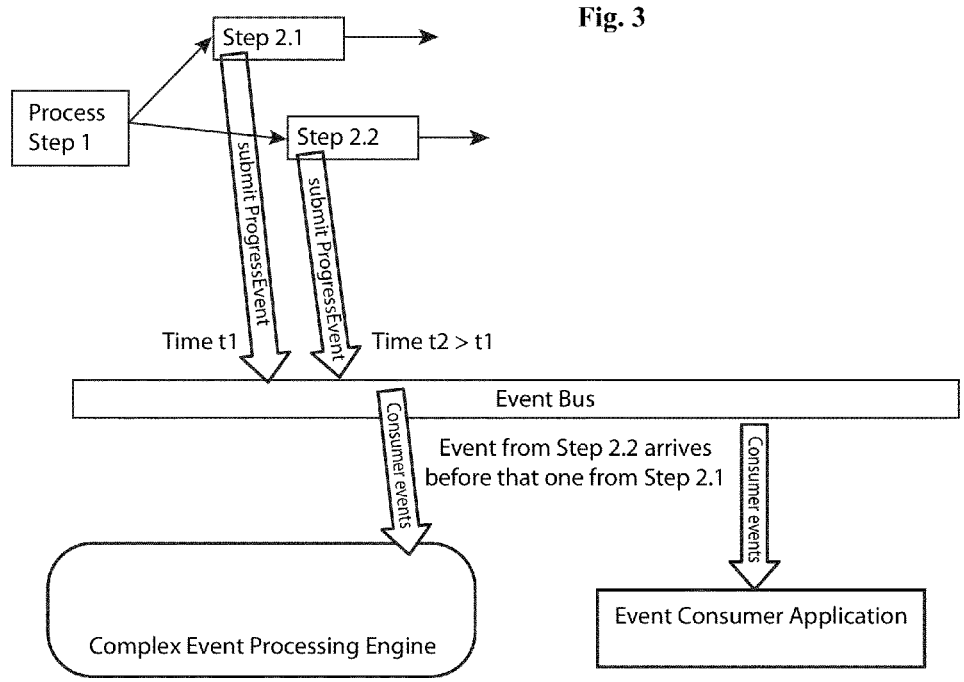

An exemplary use case for the above explained scenario is depicted in FIG. 2, which shows an event-based system in a logistics environment. Trucks carrying goods from one place to another emit events about their current status and position (e.g. by means of a GPS sensor and a wireless connection). Because of the distributed nature of this system, an event e1 from one truck (cf. "Truck no. 1" in FIG. 2) might get delayed, e.g. due to network latency, and a later event e2 from another truck (cf. "Truck no. 2" in FIG. 2) might reach the event processing engine before the event e1 of truck no. 1. If a query makes use of both events e1 and e2, the latter event does not fit into the time sequence, i.e. it arrives out of sequence. FIG. 3 illustrates a similar use case where the event-based system is used to monitor and drive a business process. In this example, "Process Step 1" in the main process forks two independent sub processes with "Step 2.1" and "Step 2.2", which can be executed in parallel. Similar to the use case of FIG. 2, events coming from one step can overtake events from the other step, leading again to "out of sequence" situations.

Figure 4:
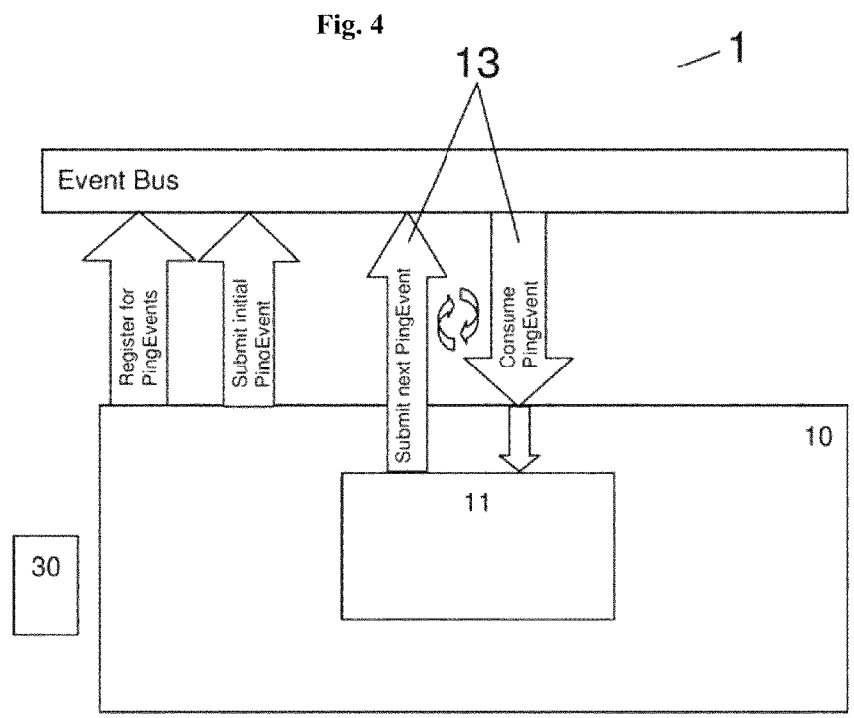

An approach for monitoring Quality of Service (QoS) aspects in event-based systems is described in "Quality of Service in Event-based Systems" of Appel et al. (cf. http://ceur-ws.org/Vol-581/gvd2010_4_3.pdf). The document proposes a QoS architecture (which is shown in FIG. 4 of the document) with a variety of layers assigned to respective quality categories in the context of a Message-Oriented Middleware (MOM) providing publish/subscribe capabilities for QoS functionalities. The events regarded in this document comprise quality data (cf. FIG. 5 of the document). Each event producer or consumer publishes events and statistical information, while the event transporting middleware itself can publish data accounting for QoS. The document discloses that the middleware can also act as a message consumer, however, the messages referred to in the document are limited to QoS information, rather than using the regular output of an event processing system to evaluate the correct functioning of the system.

Further, international patent application publication WO 2013/016246 A1 provides general background information for event-based monitoring systems. The document discloses a network monitoring and testing system comprising an event processing system. The event processing system is responsible for processing data events using a KPI configuration and for generating KPI data events.

In summary, the prior art approaches for monitoring complex distributed computing systems run the risk of errors, such as failures in transmission (e.g. incorrect or missing status information) or installation set ups (e.g. missing computing components or overload of components/interactions) of the monitoring system. These errors might in turn lead to an inefficient and/or incorrect monitoring of the computing components of the system to be monitored. SLA violations or other types of violations might be detected too late and comprise errors. As explained above, a further important disadvantage is the lacking capability of prior art systems to deal with event-based semantics.

It is therefore the technical problem underlying certain example embodiments to provide an event-based monitoring system which facilitates a more efficient yet reliable monitoring, thereby at least partly overcoming the above explained disadvantages of the prior art.

This problem is according to one aspect of certain example embodiments solved by an event-based system adapted for self-monitoring. In the embodiment of claim 1, the event-based system comprises:

a. a complex event processing, CEP, engine, adapted for consuming and producing events in accordance with at least one continuous query;

b. wherein the CEP engine comprises a first continuous query, adapted for producing events of a first event type and for consuming the events of the first event type;

c. wherein the CEP engine is adapted for detecting performance issues based on the first continuous query.

Accordingly, the embodiment defines a system for run-time governance of event-based systems, i.e. for monitoring the behavior of a system in order to detect performance issues. The event-based system comprises a CEP engine which is capable of executing any number of continuous queries deployed thereto. As it is known in the art, the CEP engine to this end consumes events (preferably received via an event bus), executes one or more continuous queries thereon, and produces one or more output events (which are preferably again published on the event bus). As it is known in the prior art, continuous queries deployed to the CEP engine are used for the processing of events, wherein various types of queries can be defined depending on the application requirements of the event-based system.

Importantly, the event-based system of certain example embodiments is adapted for self-monitoring, i.e. the embodiment is based on the concept that the monitoring system is at the same time the system to be monitored. To this end, the CEP engine comprises a first continuous query which produces events of a first event type, wherein these events are also consumed by this first continuous query. This creates a feedback loop, which is the basis for providing insight into the operational behavior of the event-based system, for ensuring that certain quality measures are met and/or counter actions can be taken when these quality measures are likely to run out of acceptable values.

Contrary to the prior art approaches described further above, the inventive system thereby avoids the need for implementing the monitoring logic in external components and thus the need for constant status polling. As a result, the system of certain example embodiments does not require any external monitoring system. The feedback loop established by means of the first continuous query serves as the basis for monitoring and detecting a variety of different types of performance issues, where event roundtrip times exceed certain thresholds, and where the event-based system suddenly becomes inoperable e.g. due to a crash of the system. These types of error situations and their timely detection in the event-based system of certain example embodiments will be described in more detail further below.

In one aspect of certain example embodiments, events of the first event type indicate a creation time of the event, a sequence number, a host identifier of the CEP engine and/or a process identifier of the CEP engine. Accordingly, the events propagated through the feedback loop established by the first continuous query comprise data that allows to establish an ordered sequence of so-called "ping" events due to the contained creation time and sequence number. Furthermore, host identifiers and/or process identifiers of the CEP engine executing the first continuous query might be taken into account to make sure that the first continuous query deployed to the CEP engine only consumes events which it produced itself.

In another aspect of certain example embodiments, the first continuous query is adapted for consuming an event of the first event type, and for producing an event of the first event type indicating a subsequent sequence number. Accordingly, the events of the first event type are constantly running through the feedback loop. When an event enters the CEP engine with a certain sequence number, the subsequently produced event is assigned with a subsequent sequence number to guarantee the correct ordering of the events of the first event type (i.e. the "ping" events).

Preferably, the event of the first event type indicating a subsequent sequence number is produced only after a pre-defined waiting time has elapsed. Accordingly, next events with a subsequent sequence number might be generated only after a pre-defined waiting time, the value of which may be stored in a configuration file. Accordingly, it is possible to define the pace at which events for establishing the feedback loop are created in order not to overload the event-processing system. The waiting time can be adjusted as desired, e.g. whenever a particularly timely detection of performance issues is desired, the waiting time between two feedback loop events can be decreased. Contrary, whenever the system is busy and possibly inefficiently running due to overload, the waiting time can be increased for the sake of better performance, but at the cost of less timely detection of performance issues.

In yet another aspect of certain example embodiments, the CEP engine comprises a second continuous query, adapted for consuming an event of the first event type, for determining a round-trip time of the event, and for producing an event of a second event type indicating a performance issue, if the round-trip time exceeds a pre-defined threshold value. Accordingly, in this example aspect, a further (second) continuous query is deployed to the CEP engine. This second continuous query consumes the "ping" events of the first event type, measures the round trip-time of the event, and whenever the measured round-trip time exceeds a pre-defined threshold value, e.g. defined in a configuration file, an event of a second event type is produced which indicates a violation of the round-trip time. Events of the second event type may indicate the time of detection of the performance issue, the determined round-trip time, a host identifier of the CEP engine and/or a process identifier of the CEP engine.

In a further aspect of certain example embodiments, the CEP engine is adapted for producing an event of a third event type indicating a performance issue, if an event is received out of sequence by the CEP engine. Preferably, the CEP engine is to this end adapted for determining that an event is received out of sequence by comparing a time stamp of the event to a time stamp of a preceding event. Accordingly, the event-based system of certain example embodiments is in this aspect also capable of detecting events that arrive out of sequence. Generally, a sequence of events can be considered as the pre-defined ordering of incoming and/or outgoing events e1, e2, . . . , en. The ordering of events can be defined via a timestamp and/or sequence number for each event (t1, t2, . . . , tn). In other words, whenever an event is received by the CEP engine with a wrong timestamp and/or sequence number, the CEP engine produces an event of the third event type which indicates a violation of the sequence order. This is of importance in order for the events to be processed correctly. It should be mentioned that for detecting sequencing issues based on the sequence number, the event emitters need to be synchronized in order to impart a valid sequence number to the events. If this type of violation is not detected or detected too late, an event e2 depending on an event e1 might be processed incorrectly, thereby leading to errors in the event-based system.

Preferably, events of the third event type indicate the time of detection of the performance issue, the event type of the event that was received out of sequence, event data, a host identifier of the CEP engine and/or a process identifier of the CEP engine.

The event-based system may further comprise a monitoring client, adapted for consuming events of the first event type, and for detecting that the CEP engine is out of operation. Accordingly, it might be of further interest to detect that the event-based system is no longer operating or shutdown e.g. due to a power breakdown. Therefore, a monitoring client might be employed which consumes events of the first event type (i.e. "ping" events) and detects when the event-based system is out of operation (e.g. when the monitoring client did not receive a "ping" event after a pre-defined waiting time).

In another aspect of certain example embodiments, the event-based system is further adapted for measuring the processing time of processing a received event, and for allocating additional processing resources if the measured processing time exceeds a pre-defined threshold value. Accordingly, the event-based system can flexibly adapt its processing resources, in case it is noticed that it takes too long to process the events.

In yet another aspect, events of the first event type are produced only after a pre-defined waiting time has elapsed, and the monitoring system is adapted for automatically adjusting the pre-defined waiting time. The adjusting of the pre-defined waiting time may be based on performance statistics of the CEP engine, such as the number of queries presently executing. Accordingly, the waiting times employed in the present system can be flexibly and automatically adjusted e.g. by calculating performance statistics.

Certain example embodiments relate to a method for self-monitoring an event-based system by operating the event-based system in accordance with any of the above-described aspects. Certain example embodiments provide a computer program comprising instructions for implementing the above-described method.

3. BRIEF DESCRIPTION OF THE DRAWINGS

In the following detailed description, presently preferred embodiments are further described with reference to the following figures:

FIG. 1: Schematic representations of two monitoring approaches using external monitoring systems according to the prior art.

FIG. 2: A schematic illustration of a situation where events arrive out of sequence in a logistics use case.

FIG. 3: A schematic illustration of a situation where events arrive out of sequence in a business process use case.

FIG. 4: A block diagram of an event-based system adapted for self-monitoring, comprising a CEP engine with a first continuous query for establishing a feedback loop in accordance with certain example embodiments.

Figure 5:
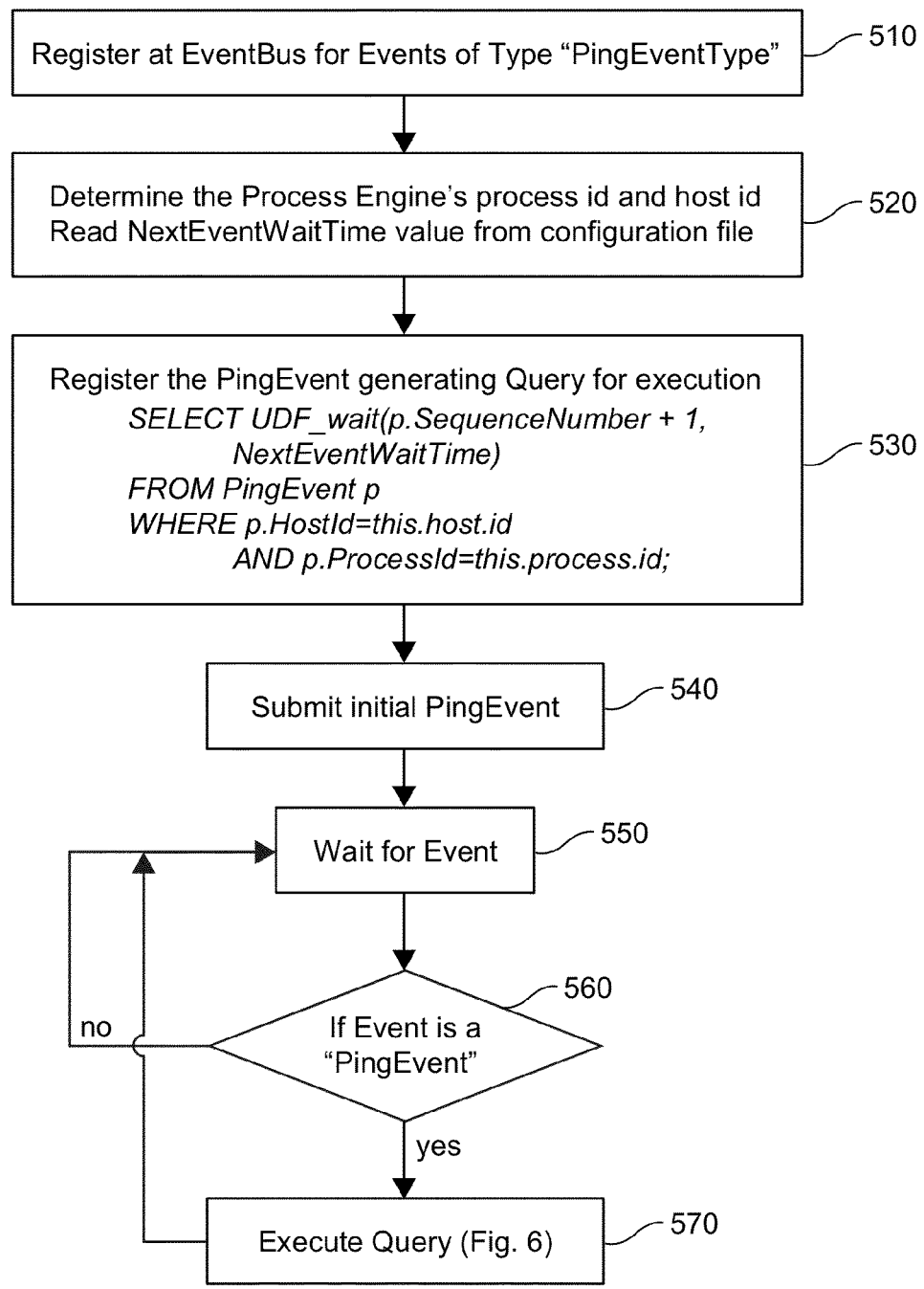
Figure 6:
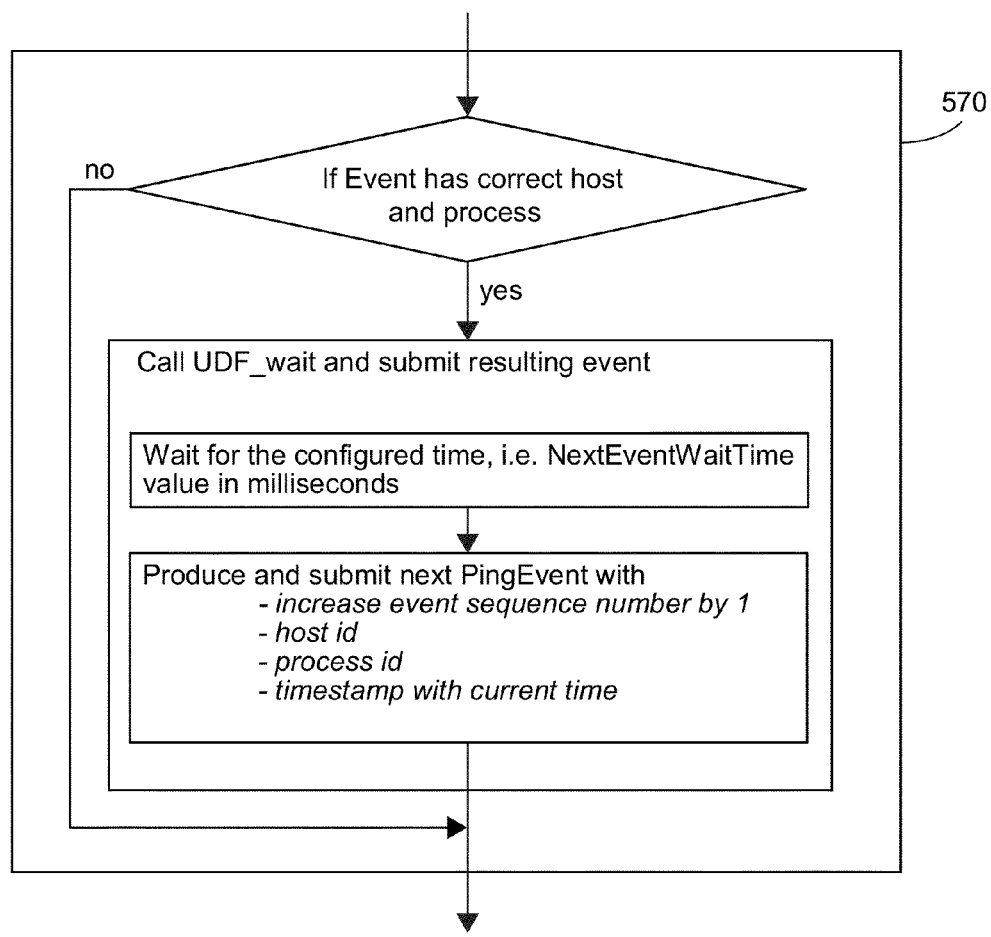

FIGS. 5 and 6: Flow charts illustrating the flow of execution of the system of FIG. 4 in accordance with certain example embodiments.

Figure 7:
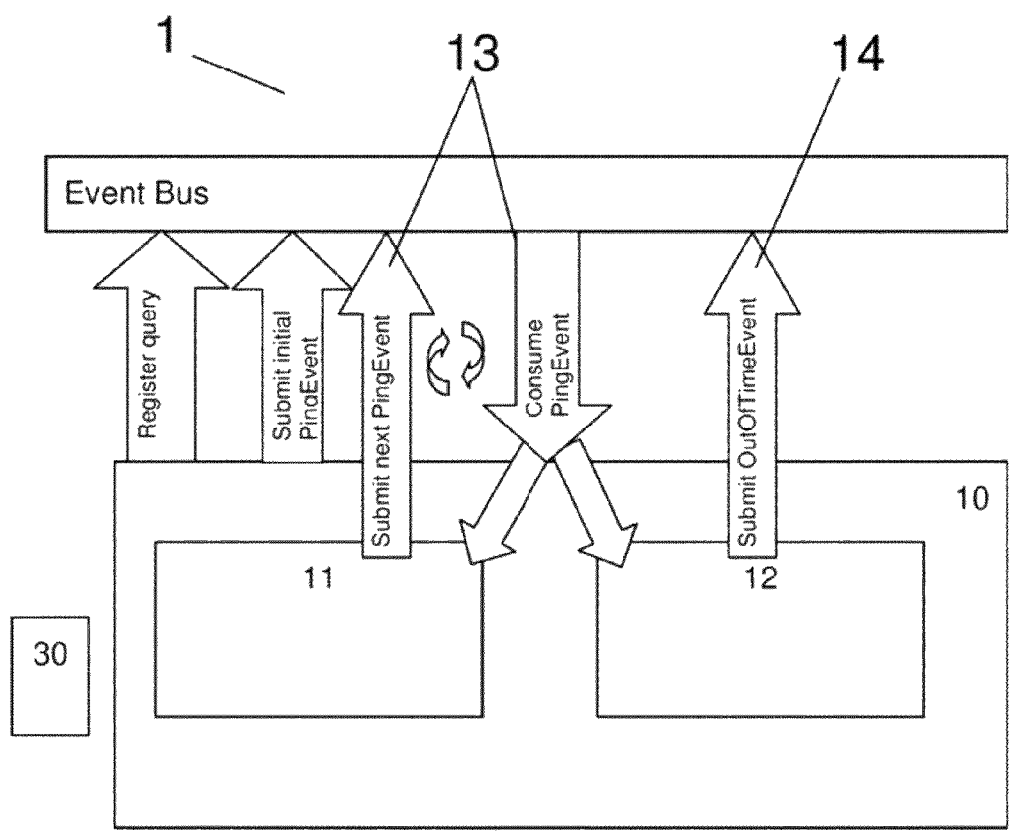

FIG. 7: A block diagram of an event-based system adapted for self-monitoring, comprising a CEP engine with a first and second continuous query for detecting "out of time" performance issues in accordance with certain example embodiments.

Figure 8:
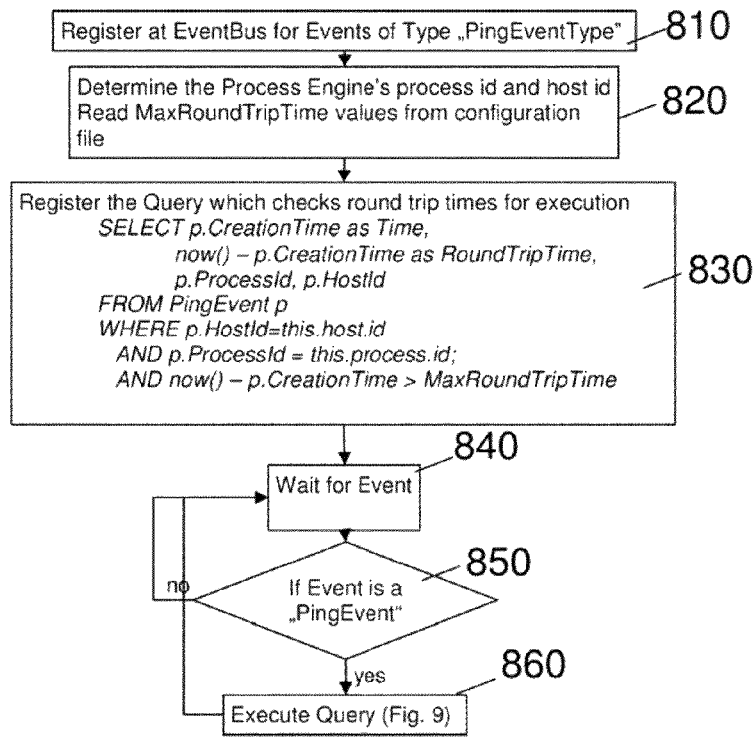
Figure 9:
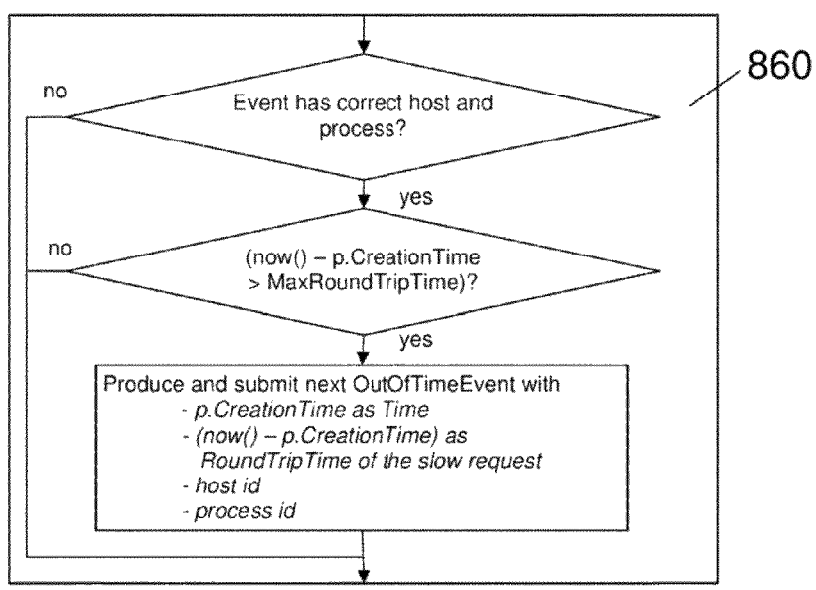

FIGS. 8 and 9: Flow charts illustrating the flow of execution of the system of FIG. 7 in accordance with certain example embodiments.

Figure 10:
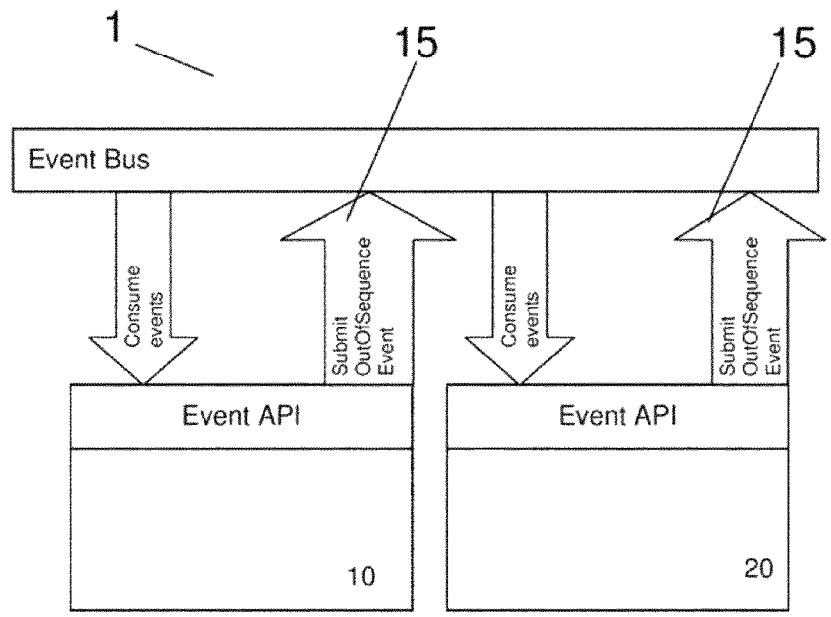

FIG. 10: A block diagram of an event-based system adapted for self-monitoring, comprising a CEP engine for producing events of a third event type indicating "out of sequence" performance issues in accordance with certain example embodiments.

Figure 11:
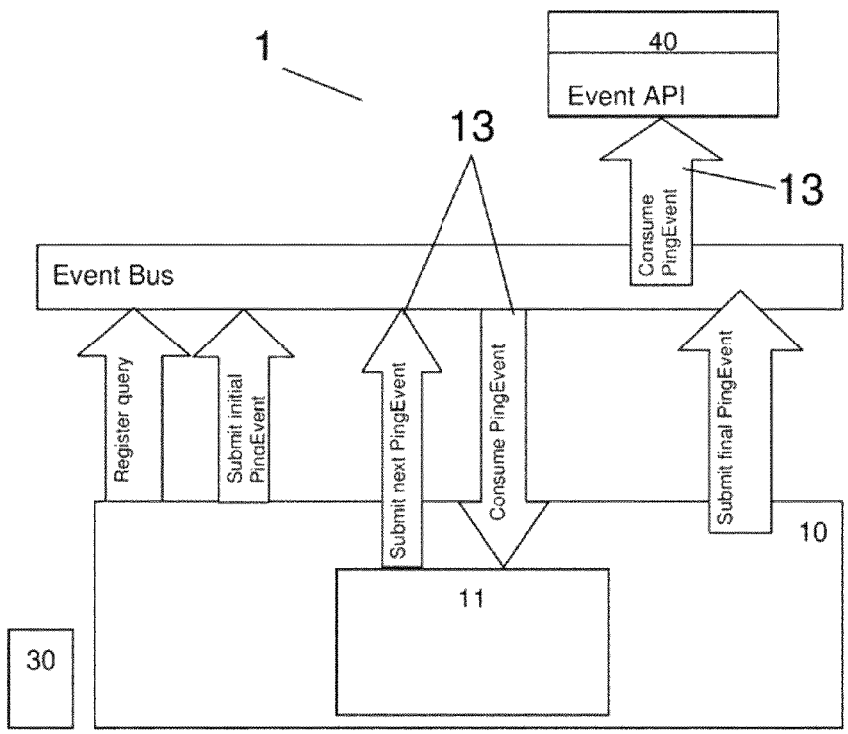

FIG. 11: A block diagram of an event-based system adapted for self-monitoring, comprising a monitoring client for detecting "out of operation" performance issues in accordance with certain example embodiments.

Figure 12:
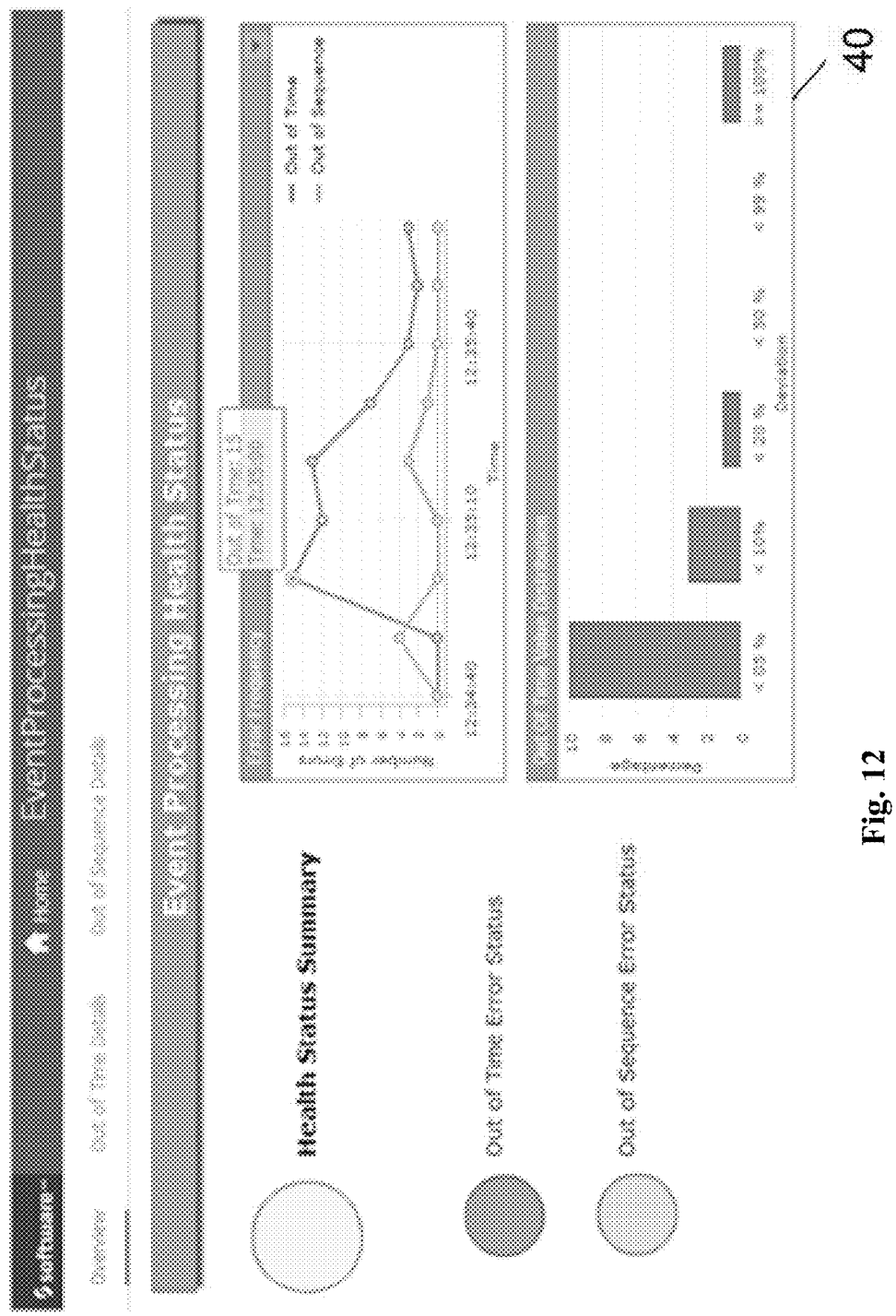

FIG. 12: An exemplary dashboard of the monitoring client of FIG. 11 in accordance with certain example embodiments.

Figure 13:
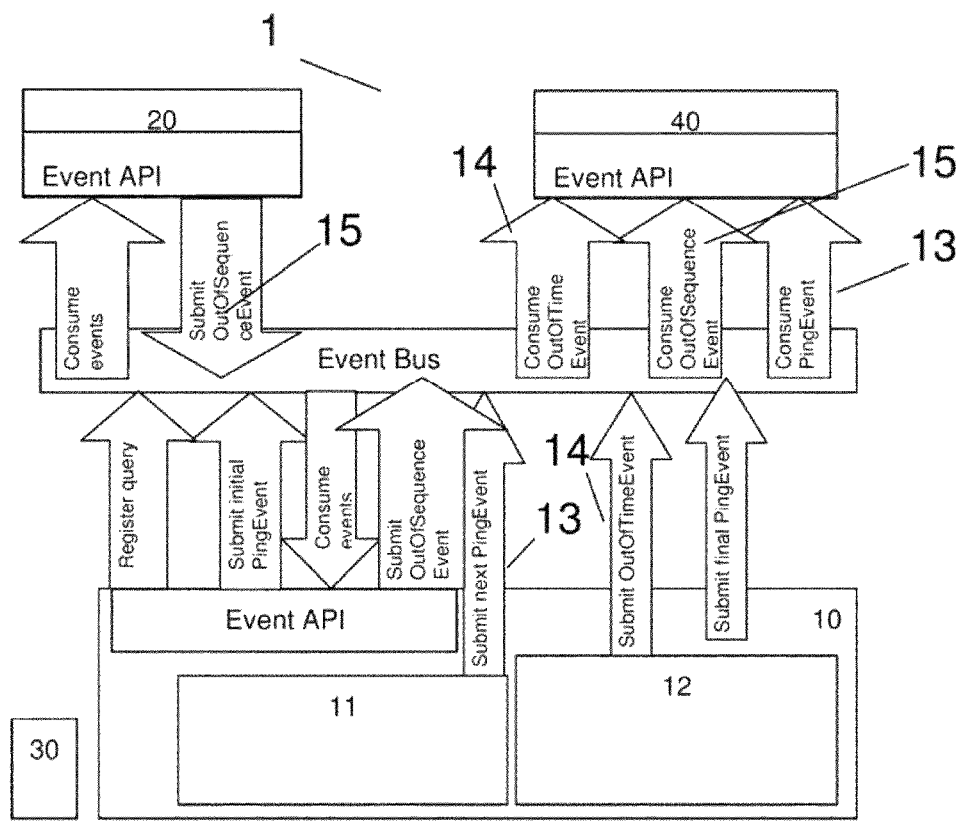

FIG. 13: A block diagram of an event-based system adapted for self-monitoring in accordance with certain example embodiments.

Figure 14:
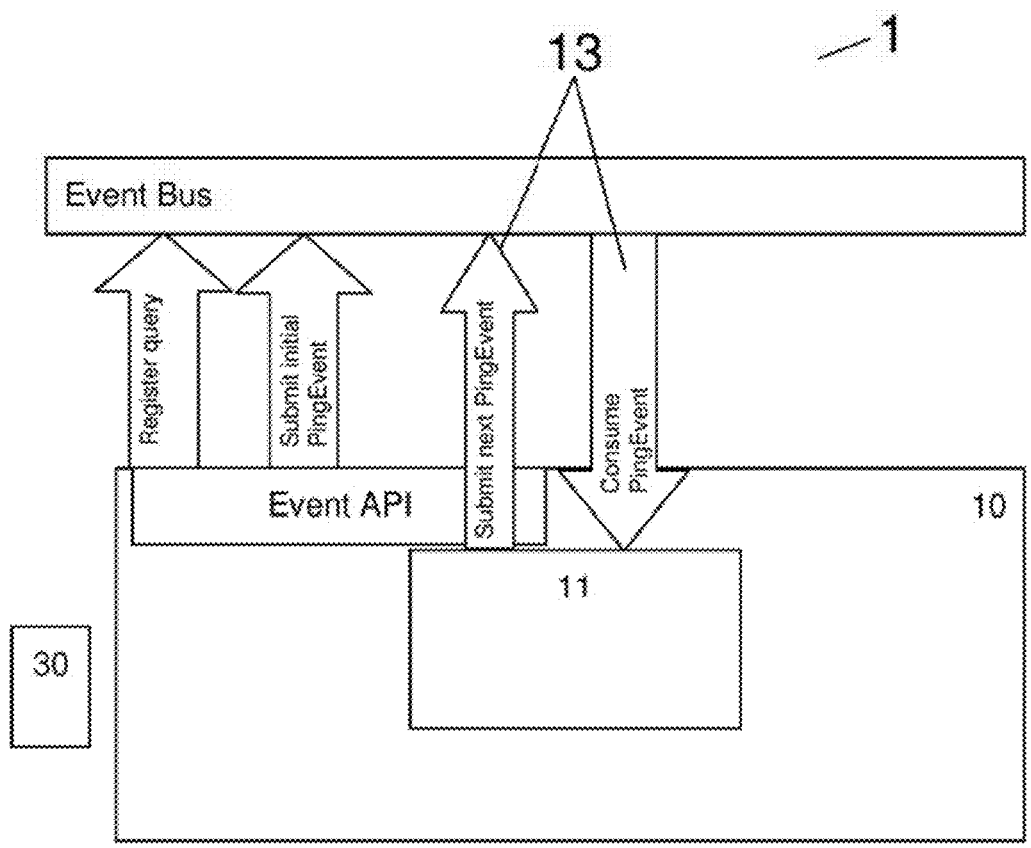

FIG. 14: A block diagram of an event-based system adapted for self-monitoring, adapted for self-adjusting in accordance with certain example embodiments.

Figure 15:
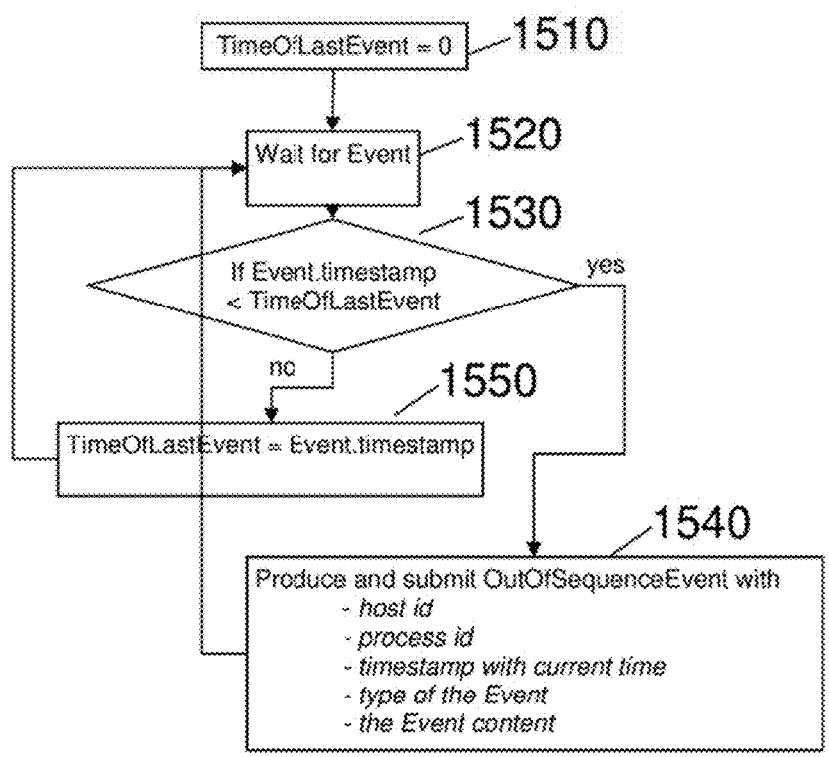

FIG. 15: A flowchart illustrating the control flow for detecting out-of-sequence events in accordance with certain example embodiments.

4. DETAILED DESCRIPTION

Introduction to Event-Based Systems and Complex Event Processing

In event-based systems, events typically carry information about computing components representing assets in the real world or state changes in the real world. Event queries (also referred to as "continuous queries") typically aggregate and correlate event information from event streams, which continuously arrive at the event engine (also referred to as "complex event processing engine" or "CEP engine"). The queries are used to implement certain application logic, similar to traditional SQL queries in database systems which also implement application logic. In contrast to traditional database applications, which pull information from the data via SQL queries on request, event queries continuously evaluate queries on events which are pushed into the system at the time when the events are created. A CEP engine is usually set up to consume events from third parties, and the queries aggregate and correlate events for the use by the same or other third parties.

An Event-Based System Adapted for Self-Monitoring

Contrary to the prior art, certain example embodiments are based on the concept that the CEP engine of an event-based system consumes the events that it produced itself, thereby establishing a feedback loop for detecting various types of performance issues. The event-based system is thus enabled to internally check or self-monitor its own health status without the need for external monitoring systems.

An embodiment of the self-monitoring event-based system 1 is illustrated in FIG. 4, which highlights the above-mentioned feedback mechanism. As can be seen, the system 1 comprises a CEP engine 10 in communication with an event bus, i.e. the CEP engine 10 is capable of receiving (consuming) events from the event bus and producing events, which are again published to the event bus.

FIG. 4 also illustrates that the CEP engine 10 comprises a first continuous query 11, which serves for producing events 13 of a first event type (also referred to as "PingEvents" or "ping events"), and for consuming the events 13 of the first event type (i.e. a feedback loop of PingEvents is established). An example for the first continuous query 11 is shown below:

```
SELECT UDF_wait(p.SequenceNumber + 1, NextEventWaitTime)
FROM PingEvent p
WHERE p.HostId = this.host.id
AND p.ProcessId = this.process.id
```

Events 13 of the first event type preferably comprise the following information: CreationTime, ProcessId, HostId, SequenceNumber.

The flow of execution performed by the CEP engine 10 is illustrated in FIGS. 5 and 6. According to FIG. 5, first the CEP engine 10, preferably during start-up, registers itself at the event bus for events of type "PingEventType", i.e. the CEP engine 10 subscribes to this type of events in order to get informed by the event bus when a new "ping event" 13 has occurred (cf. step 510 in FIG. 5 and also the left-most arrow in FIG. 4). In a second step 520, the host identifier and process identifier of the CEP engine 10 is determined and the pre-defined waiting time is read from a configuration file 30 (which may e.g. define "NextEventWaitTime" to be 10 milliseconds). The first continuous query 11 is registered for execution in step 530. Next, the CEP engine 10 emits an initial ping event to the Event Bus in step 540 (see also the second arrow from the left in FIG. 4) and goes into a waiting state in step 550. As a listener to events of type PingEventType, the CEP engine 10 receives the event it emitted in step 540 a bit later as input from the event bus (see the right-most arrow in FIG. 4). Namely, each time the CEP engine 10 receives an event, it checks whether the event is of type "PingEventType" in step 560. If not, the CEP engine 10 returns to the waiting state in step 550. In the other case, i.e. when the received event is a ping event, the CEP engine 10 processes this ping event 13 by executing the first continuous query 11 in step 570. After the event 13 has been processed, the CEP engine 10 returns to the waiting state 550.

The execution of the first continuous query 11 in accordance with step 570 of FIG. 5 is illustrated in more detail in FIG. 6. The query 11 checks if the event 13 was created by the CEP engine 10 itself (see the WHERE clause in FIG. 5, which compares the host id and process id values comprised in the event 13 with the values obtained in step 520). The query 11 then calculates the next sequence number and emits the next ping event 13 with the new sequence number to the event bus (see also the arrows in FIG. 4 reflecting the aforementioned feedback loop). In order to not generate too much load on the system, the query 11 can optionally create the next ping event 13 in a user-defined function which also takes the waiting time configuration parameter from the configuration file into account for determining a wait time before the next event can be submitted to the Event Bus. The steps of producing and consuming events 13 by the CEP engine 10 iterate in an endless loop, e.g. until the engine 10 is shut down.

Based on the above-explained execution flow which establishes a feedback loop of subsequent ping events 13, the event-based system 1 of certain example embodiments is capable of monitoring and detecting various types of performance issues, which will be independently described in the following.

Performance Issue—Out of Time Detection

In one embodiment, the event-based system 1 is capable of detecting when the round-trip time of events travelling through the event bus and the CEP engine 10 exceeds a threshold.

As shown in FIG. 7, in addition to the first continuous query 11 described in connection with FIG. 4, the CEP engine 10 comprises also a second continuous query 12 for evaluating round-trip execution times. An exemplary second continuous query 12 is shown below:

```
SELECT p.CreationTime as Time,now( ) - p.CreationTime as
    RoundTripTime, p.ProcessId, p.HostId
FROM PingEvent p
WHERE p.HostId = this.host.id
    AND p.ProcessId = this.process.id
    AND now( ) - p.CreationTime > MaxRoundTripTime;
```

As can be seen, the second continuous query 12 also consumes ping events 13 of the first event type, but produces events 14 of a second event type (hereinafter also referred to as "OutOfTimeEvents"). Generally speaking, the second continuous query 12 compares the current time stamp with the incoming PingEvent's creation time and if the time difference exceeds a certain limit (which can be stored in a configuration parameter from a configuration file 30, e.g. as "MaxRoundTripTime" with a value of 10 milliseconds) an OutOfTimeEvent 14 will be thrown. An OutOfTimeEvent 14 indicates the associated error and comprises information about the time when the error occurred, the loopback execution time that was observed, plus HostId and ProcessId to uniquely identify the CEP engine 10 within the environment.

The detailed flow of execution is illustrated in FIGS. 8 and 9. Step Bio of FIG. 8 corresponds to step 510 described in connection with FIG. 5. In step 820 of FIG. 8, the host identifier and process identifier of the CEP engine 10 is determined and a configuration file (e.g. the file 30 shown in FIG. 7) is consulted to obtain a maximum round-trip time parameter value. At step 830, the second continuous query 12 is registered. The CEP engine 10 then waits for incoming events in step 840. When an event is received, the CEP engine 10 checks whether the received event is of type "PingEvent" in step 850. If not, the processing returns to the waiting state in step 840. In the other case, the second continuous query 12 is executed on the received ping event 13 in step 860.

The execution of the second continuous query 12 in accordance with step 860 of FIG. 8 is illustrated in more detail in FIG. 9. First, it is checked whether the event has the correct host and process identifier. If so, it is checked whether the time difference between the current time and the creation time indicated in the ping event 13 is greater than the pre-defined maximum round-trip time. If so, an OutOfTimeEvent is generated.

Performance Issue—Out of Sequence Detection

The mechanisms described above serve for internally discovering performance issues by the event-based system 1 without the need for an external monitoring component. Performance issues can be published to the event bus as events, i.e. the monitoring mechanism makes use of the existing infrastructure of the event-based system 1.

Similarly, also logical issues can be discovered internally in the CEP engine 10 and these issues can again be published in the existing infrastructure as events. To this end, a special implementation of the API (application programming interface) which is used by event publishers and consumers to work with events is provided. Generally, every event consumer and event emitter in an event-based system uses an implementation of an API to submit and receive events from the event bus (this includes the CEP engine 10 and the exemplary event consumer application 20 as shown in FIG. 10). When receiving an event, the implementation can discover events that are out of sequence, i.e. they are older than the last processed event (as already explained above in connection with FIG. 2 and FIG. 3). Certain example embodiments provide an extension of the event API implementation to submit an "OutOfSequenceEvent" 15 (cf. FIG. 10) immediately at the time when such a situation occurred. These OutOfSequenceEvents 15 comprise information about when the error occurred, which event type was affected and event detail information as a string, plus process.id and host.id.

Preferably, like PingEvents 13 the OutOfTimeEvents 14 and OutOfSequenceEvents 15 are events that are solely generated by the event-based system 1 for the sake of monitoring itself and for signaling performance and logical issues.

FIG. 15 shows the control flow for out of sequence detection. Initially, the parameter "TimeOfLastEvent" is set to zero (cf. step 1510). For each incoming event (cf. step 1520) its internal timestamp is checked and it is verified that it is not outdated, i.e. older than the last event received (cf. decision branch 1530). In case it is outdated, the CEP engine 10 throws an OutOfSequence event, containing information related to the event identified as out of sequence (cf. step 1540). Such information may contain a host ID, a process ID, a timestamp with current time, an event type and/or the event's content. In case the event is not outdated (cf. step 1550), the CEP engine 10 continues to wait for the next event (i.e. the processing returns to step 1520).

Performance Issue—Out of Operation Detection

In one embodiment, a client application 40 (cf. FIG. 13), e.g. a monitoring dashboard, can analyze error events, such as the events 14 used for the round-trip check. Such client applications 40 may send out alerts, emails or initiate any other corrective measures when a performance issue is detected.

One type of client application 40 to this end listens on all the event types that are used in the context of the present monitoring system 1 (i.e. PingEvents 13, OutOfTimeEvents 14 and/or OutOfSequenceEvents 15). Furthermore, as shown in FIG. 11, the client application 40 may listen on the PingEvents 13, because if there are no more PingEvents 13 on the event bus, this means that the system 1 is no longer working. Accordingly, as soon as the client application 40 does not receive ping events 13 anymore within a pre-defined frequency (which may be defined in a configuration file 30), the client application 40 can detect that the system 1 is not operating anymore and may e.g. send out an email alert or write a log file entry.

To let the client application 40 know when the system 1 was intentionally shut down, the CEP engine 10 preferably submits a final ping event 13 which indicates the graceful shutdown (see the right-most arrow in FIG. 11).

Preferably, the client application/monitoring dashboard 40 just executes actions such as the visualization of failures based on events it receives from the event bus. All the needed information to execute the action is contained in the events. Note that the logic which detects the failures is not included in the client, but is included in the event queries described herein. The only exception to this principle is the "OutOfOperation" case, because a system that is no longer working cannot detect its own non-function.

An exemplary dashboard showing the two types of errors "OutOfTime" and "OutOfSequence" described above is shown in FIG. 12. The circles on the left hand side of the dashboard are means to visualize the overall health status of the entire system (the top circle) and of selected quality measures (the two smaller circles). They preferably make use of an ample light pattern, i.e. a green color means it is fine, a red color means it is not ok, and a yellow color means it is not yet out of control but requires some attention. The two graphs shown in FIG. 12 give some more detailed information. Additional tabs as shown at the top of FIG. 12 can visualize detailed information about the particular events.

Optional Feature: Self-Adapting System

In a further aspect, embodiments of the self-monitoring system 1 can be used by the CEP engine 10 to adjust and optimize its processing strategy internally. This makes the system also a self-managing and/or self-optimizing and/or self-curing system. For example, the CEP engine 10 may change its processing strategy, by adapting the scheduling of work and/or by changing resource allocations, as summarized in the following:

European patent application EP 2450796 A1 of applicant titled "Systems and/or methods for appropriately handling events" describes how an event processing system can adapt its scheduling strategy in case certain required performance characteristics are not met. Certain example embodiments describe one way to discover system overload.

Another approach relates to timer analysis. This means that on arrival in the CEP engine 10, an event is enriched with an arrival timestamp, so that when the event is processed the system knows how long it took inside the system until the event got processed. In case this exceeds a threshold, additional threads can be added to the processes, and/or additional memory can be allocated for the process.

Preferred Implementation

A comprehensive embodiment combining all of the above aspects is illustrated in FIG. 13. A preferred implementation of the present event-based system 1 comprises at least the following components:
1) An event bus which transports events from event emitters to event consumers
2) Any number of event consumers which make use of the events on the bus (of course there are also event emitters but these do not necessarily contribute to certain example embodiments)
3) A complex event processing engine 10 which consumes events for query processing and publishes query result events on the event bus
4) A monitoring client 40 which displays/processes the health status of the system 1

In certain embodiments, the self-monitoring based on PingEvents 13 generates additional load on the system 1 which depends on the pre-defined waiting time between two PingEvents 13. Apparently, the longer this time is, the less overhead is generated. On the contrary, the shorter this time is, the earlier the system 1 can discover overload or unexpected shutdown. An adaptive strategy can adopt the event generation rate accordingly (see FIG. 14).

In the example of FIG. 14, the first continuous query 11 (see the exemplary source code thereof further above) uses a user-defined function UDF_wait( ) which determines the waiting time based on the current load, i.e. load statistics from the CEP engine 10. The next wait time can be found in the PingEvent 13, in order that the monitoring client knows when to expect a new event.

Further, such an adaptive strategy can take a minimum and a maximum wait time into account. Exemplary definitions for the respective parameters in a configuration file 30 may be e.g.:

```
InitialPingWaitTime=100,
MinPingWaitTime=100,
MaxPingWaitTime=600,
WaitStrategy=adaptive.
It can also consider the last PingEvent round trip time (e.g.
Maximum ( minPingWait Time,
    Minimum ( maxPingWaitTime,
        maxPingWaitTime * (now – p.CreationTime) /
            MaxRoundTripTime
    )
  )
).
```

In this example (now—p.CreationTime) calculates the round trip time for PingEvent p. Compared to the maximum allowed round trip time MaxRoundTripTime, which can also be found in the configuration file 30, we calculate the wait time in the range between minPingWaitTime and maxPingWaitTime. If the round trip time of PingEvent p is very short the wait time is also short but not below minPingWaitTime, if the round trip time is very long, e.g. due to system load, the wait time goes up but not beyond maxPingWaitTime.

In more sophisticated implementations, the strategy can also take statistics from the CEP engine 10, e.g. number of queries to be executed, size of intermediate query results etc., into account.

Summary

Certain example embodiments enable a CEP system (preferably comprising a CEP engine and EventBus) to monitor its own functioning without relying on separate monitoring components. The analytic capabilities of the CEP engine are used to check that proper round-trip times are being achieved. The CEP engine can therefore notice its own errors if the event processing should go out of sync. Additionally, this self-monitoring capability may enable the CEP engine to "tune" itself in order to e.g. achieve more efficient resource usage.

To this end, instead of or in addition to setting up a CEP engine to consume events from other sources and to produce events for other components to consume, certain example embodiments propose that the CEP engine should consume its own produced events, creating a feedback loop. By means of analyzing its own events, the CEP engine can effectively determine that the established round-trip times are in accordance with pre-determined threshold values, thus achieving a self-monitoring CEP system. It is this same feedback that could also be used to optimize the CEP engine's performance.

It will be appreciated that as used herein, the terms system, subsystem, service, engine, module, programmed logic circuitry, and the like may be implemented as any suitable combination of software, hardware, firmware, and/or the like. In other words, these terms may include processing resources such as, for example, at least one processor and a memory, suitable for carrying out instructions for performing specific functions. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute or otherwise perform instructions that may be tangibly stored on a non-transitory computer readable storage medium.

What is claimed is:

1. An event-based system configured for self-monitoring, comprising:
   processing resources including at least one processor and a memory; and
   a complex event processing (CEP) engine configured to cooperate with the processing resources to consume events published to an event bus and produce events in accordance with at least one continuous query;
   wherein the CEP engine comprises a first continuous query configured to produce events of a first event type, publish the produced events of the first event type to the event bus, and to consume the events of the first event type published to the event bus by the first continuous query; and
   wherein the CEP engine is configured to detect performance issues based on the first continuous query.

2. The event-based system of claim 1, wherein events of the first event type indicate a creation time of the event, a sequence number, a host identifier of the CEP engine and/or a process identifier of the CEP engine.

3. The event-based system of claim 1, wherein the first continuous query is configured to consume an event of the first event type, and to produce an event of the first event type indicating a subsequent sequence number.

4. The event-based system of claim 3, wherein the event of the first event type indicating a subsequent sequence number is produced only after a pre-defined waiting time has elapsed.

5. The event-based system of claim 1, wherein the CEP engine further comprises a second continuous query configured to consume an event of the first event type, to determine a round-trip time of the event, and to produce an event of a second event type indicating a performance issue, if the round-trip time exceeds a pre-defined threshold value.

6. The event-based system of claim 5, wherein events of the second event type indicate the time of detection of the performance issue, the determined round-trip time, a host identifier of the CEP engine, and/or a process identifier of the CEP engine.

7. The event-based system of claim 1, wherein the CEP engine is configured to produce an event of a third event type indicating a performance issue, if an event is received out of sequence by the CEP engine.

8. The event-based system of claim 7, wherein the CEP engine is configured to determine that an event is received out of sequence by comparing a time stamp of the event to a time stamp of a preceding event.

9. The event-based system of claim 7, wherein events of the third event type indicate the time of detection of the performance issue, the event type of the event that was received out of sequence, event data, a host identifier of the CEP engine, and/or a process identifier of the CEP engine.

10. The event-based system of claim 1, further comprising a monitoring client configured to consume events of the first event type, and to detect that the CEP engine is out of operation.

11. The event-based system of claim 1, wherein the system is configured to measure the processing time of processing a received event, and to allocate additional processing resources if the measured processing time exceeds a pre-defined threshold value.

12. The event-based system of claim 1, wherein events of the first event type are produced only after a pre-defined waiting time has elapsed, and wherein the monitoring system is configured to automatically adjust the pre-defined waiting time.

13. The event-based system of claim 12, wherein the adjusting of the pre-defined waiting time is based on performance statistics of the CEP engine.

14. The event-based system of claim 13, wherein the performance statistics of the CEP engine include the number of queries presently executing.

15. A method for self-monitoring an event-based system comprising processing resources including at least one processor and a memory by operating the event-based system of claim 1.

16. A non-transitory computer readable storage medium tangibly storing a computer program comprising instructions for implementing a method in accordance with claim 15.

17. The event-based system of claim 1, wherein the first event type is a ping event, the first continuous query is further configured to publish the produced event of the first event type only after a pre-defined waiting time has passed after the preceding produced event of the first event type was published to the event bus, and wherein the pre-defined waiting time is adjusted based on a round-trip time of a consumed event of the first event type.

18. The event-based system of claim 1, wherein the CEP engine further comprises a second continuous query configured to consume events of the first event type published to the event bus by the first continuous query and produce events of a second event type indicating a performance issue, wherein
   the events of the first event type include a creation time of the event by the first continuous query, and the second continuous query produces events of the second event type indicating a performance issue when a difference between the current time and the creation time of consumed event of the first event type exceeds a predetermined limit.

19. The event-based system of claim 1, wherein the first continuous query is configured to calculate a sequence number and include the calculated sequence number in the produced events of the first event type, such that each new produced event of the first event type includes a subsequent sequence number; and wherein the CEP engine further comprises a second continuous query configured to consume only events of the first event type published to the event bus by the first continuous query and produce events of a second event type indicating a performance issue when, based on the sequence numbers included in the consumed events of the first event type, the received events of the first event type are received out of sequence.

20. The event-based system of claim 1, wherein the CEP engine further comprises a second continuous query configured to consume events of the first event type produced by the first continuous query and to produce events of a second event type, different from the first event type, when a performance issue is detected based only on time stamps and/or a sequence numbers included in the events of the first event type by the first continuous query.

21. A self-monitoring method for an event-based system including processing resources including at least one processor and a memory, the method comprising:

consuming events published to an event bus and producing events, using a complex event processing (CEP) engine that cooperates with the processing resources of the event-based system, in accordance with at least one continuous query, the CEP engine working with at least a first continuous query to produce events of a first event type, to publish the produced events of the first event type to the event bus, and to consume the events of the first event type published to the event bus by at least the first continuous query; and detecting, using the CEP engine, performance issues based on the first continuous query.

* * * * *